United States Patent [19]

Hashino et al.

[11] Patent Number: 4,614,655

[45] Date of Patent: Sep. 30, 1986

[54] PROCESS FOR THE PREPARATION OF SALT-FREE PICKLED VEGETABLES

[75] Inventors: Tomiko Hashino, Nara; Ichie Omura, Hirakata, both of Japan

[73] Assignee: Hashino Yakuhin, Ltd., Osaka, Japan

[21] Appl. No.: 708,220

[22] Filed: Mar. 5, 1985

[30] Foreign Application Priority Data

Mar. 7, 1984 [JP] Japan ............................ 59-43252

[51] Int. Cl.$^4$ ............................................. A23B 7/10
[52] U.S. Cl. ........................................ 426/49; 426/615
[58] Field of Search ................... 426/17, 49, 615, 626

[56] References Cited

U.S. PATENT DOCUMENTS

| | | | |
|---|---|---|---|
| 2,899,314 | 8/1959 | Rohrkaste | 426/49 |
| 2,960,410 | 11/1960 | Rohrkaste | 426/49 |

FOREIGN PATENT DOCUMENTS

| | | | |
|---|---|---|---|
| 50-21543 | 7/1975 | Japan | 426/615 |
| 88396 | 8/1978 | Japan | |
| 208968 | 12/1982 | Japan | 426/615 |

OTHER PUBLICATIONS

Kuroiwa 1979, Efficacy of Pure Rice Vinegar, Kenkoigakusha Co. Ltd., Tokyo, Japan, pp. 127–136.
Guthrie et al. 1974, A Primer for Pickles, 101 Productions, San Francisco, pp. 12, 13, 42, 81, 88, 89 and 115.
Gillette et al. 1929, The White House Cookbook, Saalfield Publishing Co., Akron, Ohio, pp. 203 and 207.
Frazier, 1967, Food Microbiology 2nd Edition, McGraw-Hill Book Company, New York, pp. 378, 390 and 398.
The American Heritage Dictionary 1982, Houghton Mifflin Company, Boston, MA, p. 722.

*Primary Examiner*—Raymond N. Jones
*Assistant Examiner*—Carolyn Paden
*Attorney, Agent, or Firm*—Sheldon Palmer

[57] ABSTRACT

A process for the preparation of pickles which are salt free and taste nice, comprising adding to a vegetable such as radish, cucumber or the like, a pickling agent consisting of strained lees obtained by the brewing of natural rice vinegar, a suitable amount of a sweetening material and a small amount of an acid-neutralizing agent, and putting weight on the vegetable at a cold place of about 0°–10° C.

6 Claims, No Drawings

PROCESS FOR THE PREPARATION OF SALT-FREE PICKLED VEGETABLES

BACKGROUND OF THE INVENTION

1. Field of the Invention

The present invention relates to a process for the preparation of pickled vegetables which are salt-free and pleasing to the taste.

2. Description of the Prior Art

Usually, pickled vegetables are prepared by treating various vegetables with salt (common salt) only, with salt and rice bran, or with salt and fruit vinegar. Thus, in all heretofore known procedures, salt is essential for the preparation of pickled vegetables. Without salt, the pickled vegetables decompose and are of no practical use.

In light of existing circumstances, the present inventors have made various investigations and have now succeeded in preparing salt-free pickled vegetables by using strained lees obtained by brewing natural rice vinegar.

SUMMARY OF THE INVENTION

The present invention provides a process for the preparation of salt-free pickled vegetables which comprises adding a pickling agent consisting of strained lees from the brewing of natural rice vinegar, a suitable amount of a sweetening material and a small amount of an acid-neutralizing agent to a vegetable such as radish, cucumber, carrot, sweet pepper, etc. and placing weight on the vegetable at a low temperature.

DESCRIPTION OF THE PREFERRED EMBODIMENTS

There is no special limitation on the types of vegetables to be processed into pickled vegetables according to the present invention. As examples of such vegetables, there are included, daikon (radish), beet, turnip, cucumber, baby cucumber with petals, zucchini, carrot, celery, sweet pepper, broccoli, cauliflower, cabbage, chinese cabbage, ginger burdock, lotus rhizoma, bean sprouts and the like.

According to the present invention, it is essential to use strained lees resulting from the brewing of natural rice vinegar, as the pickling agent. The brewing of natural rice vinegar from rice, koji and water is usually effected for about 3 months, and the strained lees obtained thereby have hitherto been thrown away. In the present invention, such strained lees are utilized. A sweetening material is added to the strained lees in a suitable amount. As the sweetening material, reduced maltose also known as maltitol, sorbitol, Stevia sweetening (stevioside) and the like are suitable. However, it has been found that reduced maltose is the most preferable one because it has a pleasant sweetness, it is low in caloric value and no insulin is required for its metabolism. The amount of such sweetening material to be added may be prescribed properly. When reduced maltose is used, it is added, for example, in an amount of 5-15 parts per 100 parts of strained lees.

Further, a small amount of an acid-neutralizing agent is added to the pickling agent of the present invention. By acid-neutralizing agent, is meant an agent which acts to neutralize weak acid ingredients, especially acetic acid, contained in the strained lees from the brewing of rice vinegar. As such acid-neutralizing agent, any one which forms a salt by reaction with acetic acid may be used. However, non-toxic agents are generally preferred. More concretely, water soluble inorganic or organic salts, especially, water soluble calcium salts which readily release calcium ion, can be mentioned.

It is desirable to change or vary the amount of the pickling agent to be added to the vegetables, in accordance with the type of vegetable, the pickling time and pickling temperature, and the amounts of sweetening material and acid-neutralizing agents used. For instance, 1 part by weight of the pickling agent is added to 2 parts by weight of radish. The pickling agent may be recycled, with resupplying of any of the components that are consumed, as and when necessary necessary.

It is a characteristic feature of the present invention to effect the pickling in the cold. The temperature is usually about 0° C.–10° C., preferably 2° C.–5° C. The pickling temperature may be somewhat lower than 0° C. or somewhat higher than 10° C. When a temperature lower than 0° is used desirable pickled vegetables may be obtained by somewhat extending the pickling period. Conversely, when a temperature higher than 10° C. is used, desirable pickles may be obtained by somewhat reducing the pickling period. However, pickled vegetables obtained for example by pickling at 18° C. for a short period do not taste mild and readily decompose.

Those vegetables having soft fibrous tissue, such as radish etc., may be used just after being peeled, while those having rather tough fibrous tissue, such as carrot, burdock, etc., are desirably pickled after being sliced.

The pickled vegetables according to the present invention taste very delicious, and are substantially salt-free because they are prepared without using salt. Therefore, they are not only suitable as healthy foodstuffs for those who are required to restrict their intake of salt or calories, or those who are deficient in insulin, such as diabetics, but are also favorable as a relish for drinking sake, whisky and the like or as materials for sandwiches. Pickled vegetables prepared from radish according to the present invention taste delicious.

The present invention is further explained in the following examples, which are not intended to limit the scope of the invention.

EXAMPLE 1

To 2 kg of peeled green-top radish there was added 1 kg of a pickling agent consisting of 1 kg of strained lees obtained brewing natural rice vinegar [which brewing was effected with 2 parts of rice, 1 part of koji (*Aspergillus oryzae*) and a suitable amount of water for 3 months], 100 g of reduced maltose and 0.5 g of a water soluble calcium salt. Pickling was effected by putting a stone weight on the radish in a refrigerator for 7 days. The pickled radish obtained was very delicious, having a taste just like apple.

EXAMPLE 2

To 2 kg of carrot sliced into 2–3 mm in thickness was added 1 kg of the same pickling agent as used in Example 1, and the pickling was effected at 2° C.–5° C. for 3 days. The pickled carrot obtained still had some carrot like taste.

After pickling for longer than 3 days, the carrot taste disappeared from the pickled vegetables.

We claim:

1. A process for the preparation of salt-free pickled vegetables which comprises adding to a vegetable to be pickled a pickling agent consisting of strained lees obtained by brewing natural rice vinegar, and effective amounts of a sweetening material and an acid-neutralizing agent and placing the vegetable at a temperature of about 0° C.–10° C. for a period of time sufficient to produce a pickled product.

2. A process as claimed in claim 1 wherein the strained lees are obtained from natural rice vinegar brewed from 2 parts of rice, 1 part of koji (*Aspergillus oryzae*) and a suitable amount of water for about 3 months.

3. A process as claimed in claim 1 wherein the sweetening material is reduced maltose.

4. A process as claimed in claim 1 wherein the acid-neutralizing agent is a water soluble calcium salt.

5. A process as claimed in claim 1 wherein the vegetable is selected from the group consisting of daikon (radish), beet, turnip, cucmber, baby cucmber with petals, zucchini, carrot, celery, sweet pepper, broccoli, cauliflower, cabbage, Chinese cabbage, ginger, burdock, lotus rhizoma and bean sprouts.

6. A process as claimed in claim 1 wherein the temperature is 2° C.–5° C.

* * * * *